June 29, 1965  E. C. FRAZE  3,191,564
METHOD OF FABRICATING A SHEET METAL JOINT
Filed May 15, 1963  10 Sheets-Sheet 1
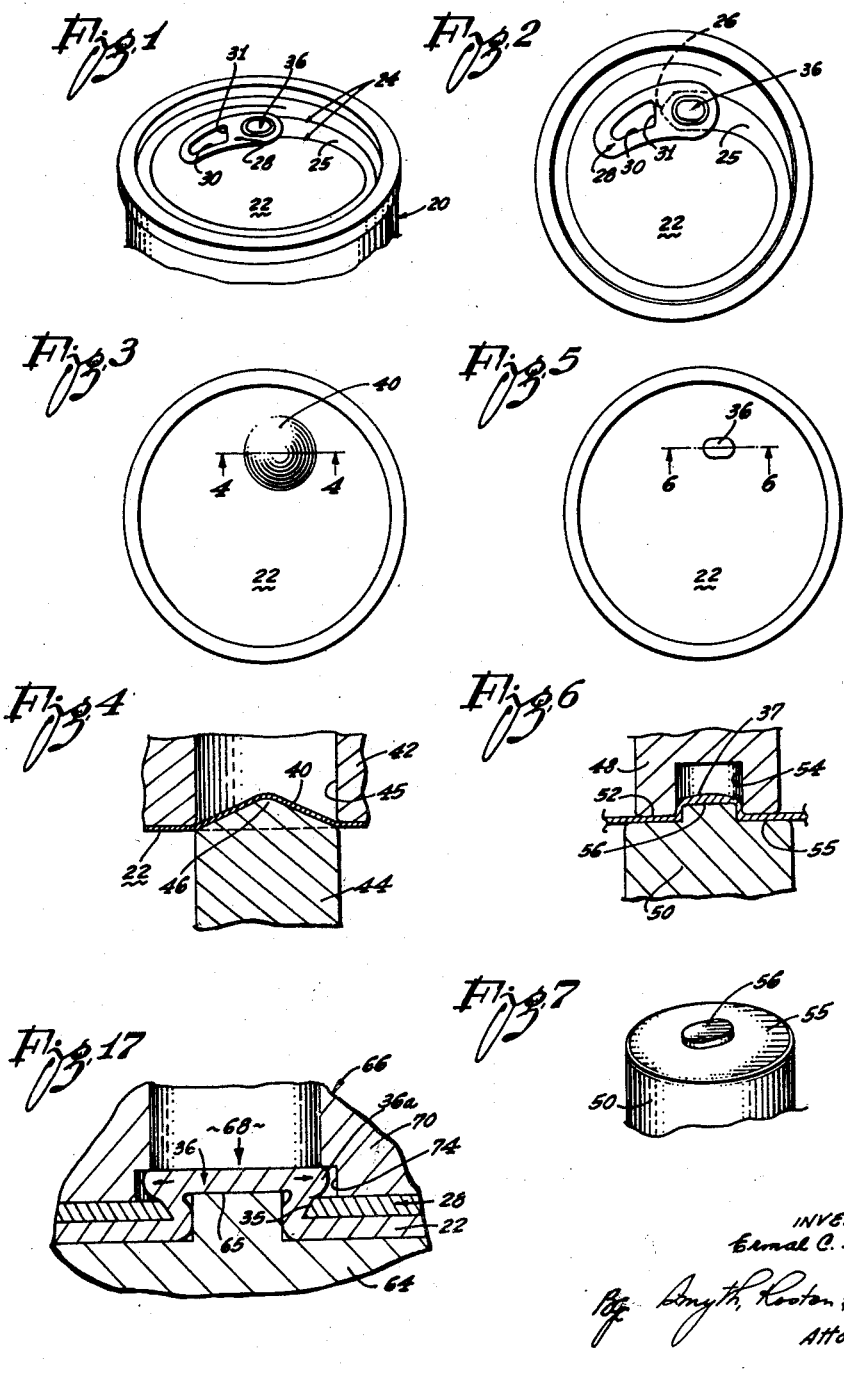
INVENTOR
Ermal C. Fraze
Attorneys June 29, 1965   E. C. FRAZE   3,191,564
METHOD OF FABRICATING A SHEET METAL JOINT
Filed May 15, 1963   10 Sheets-Sheet 2
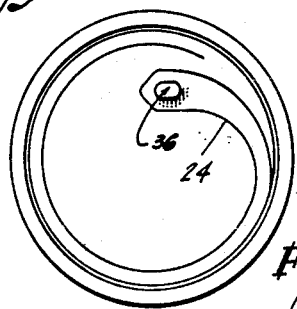
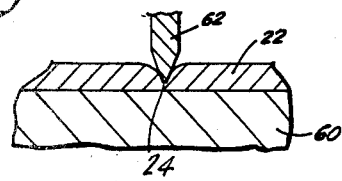
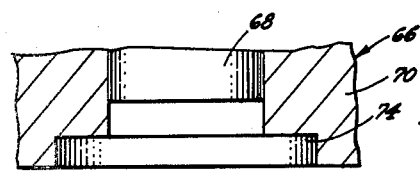
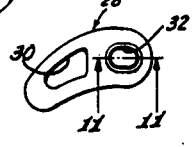
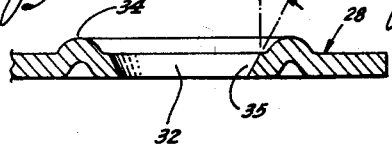
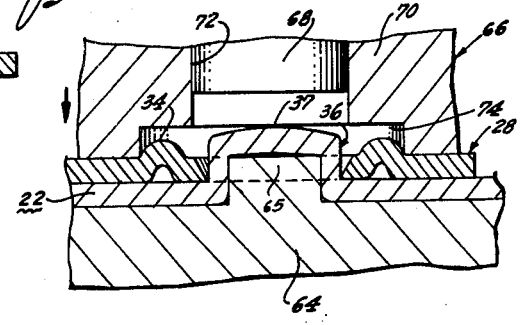
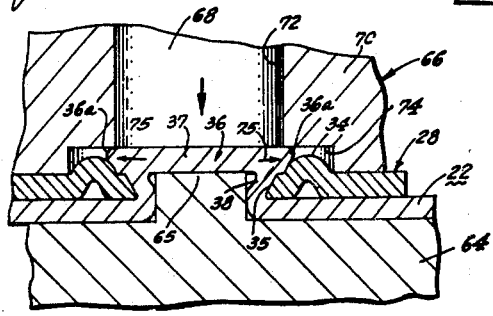
INVENTOR:
Ermal C. Fraze
By Smyth, Roston & Pavitt
Attorneys

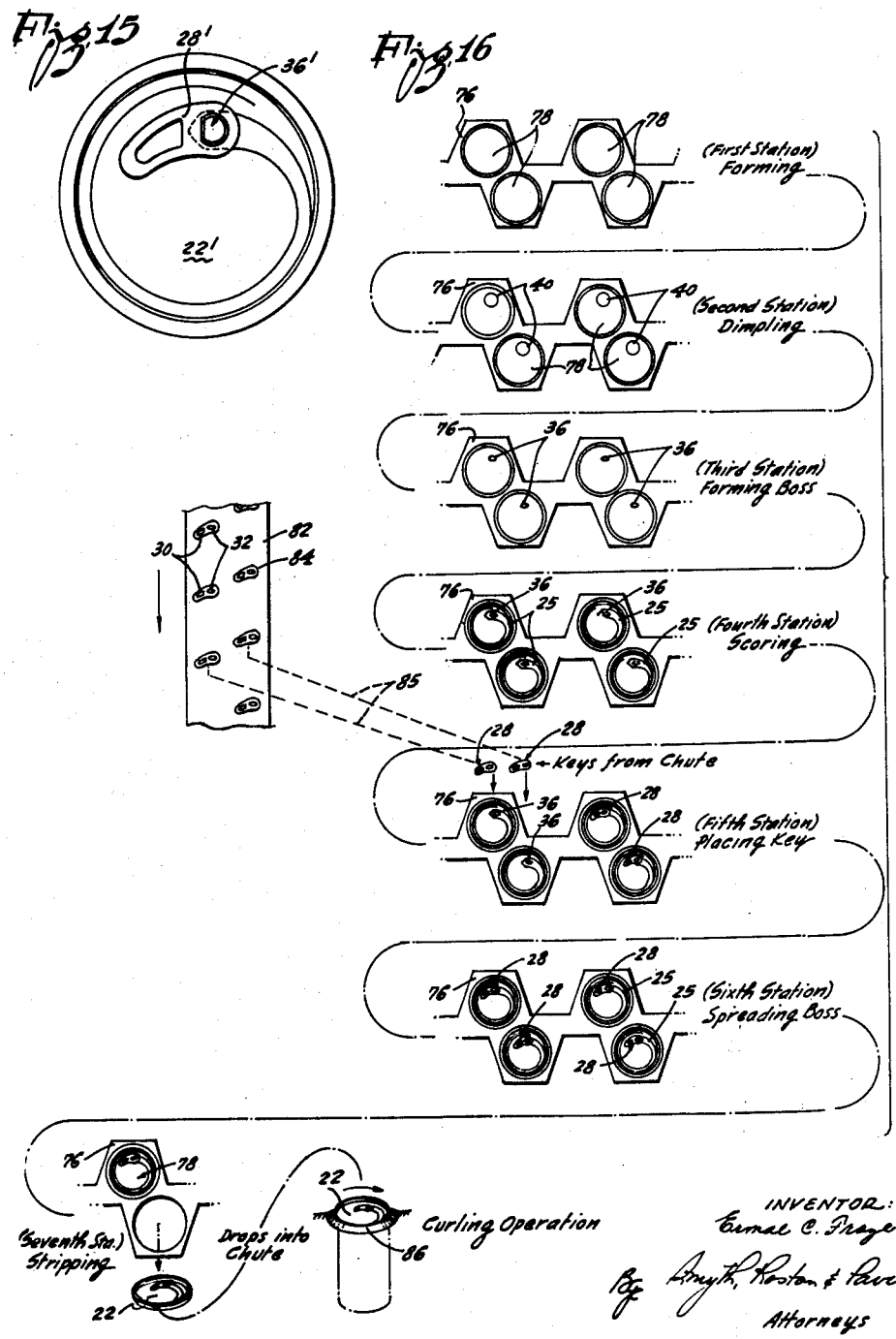

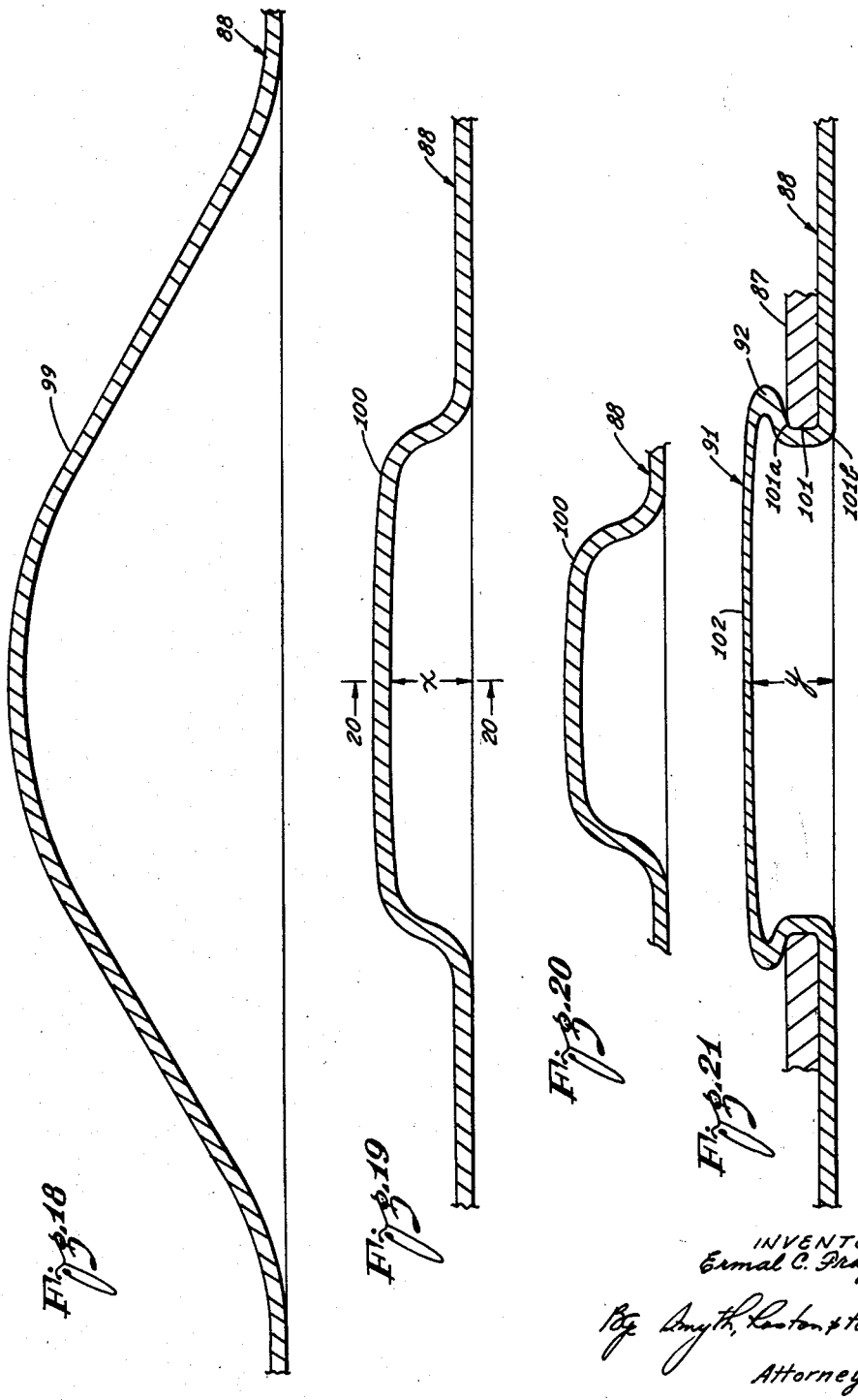

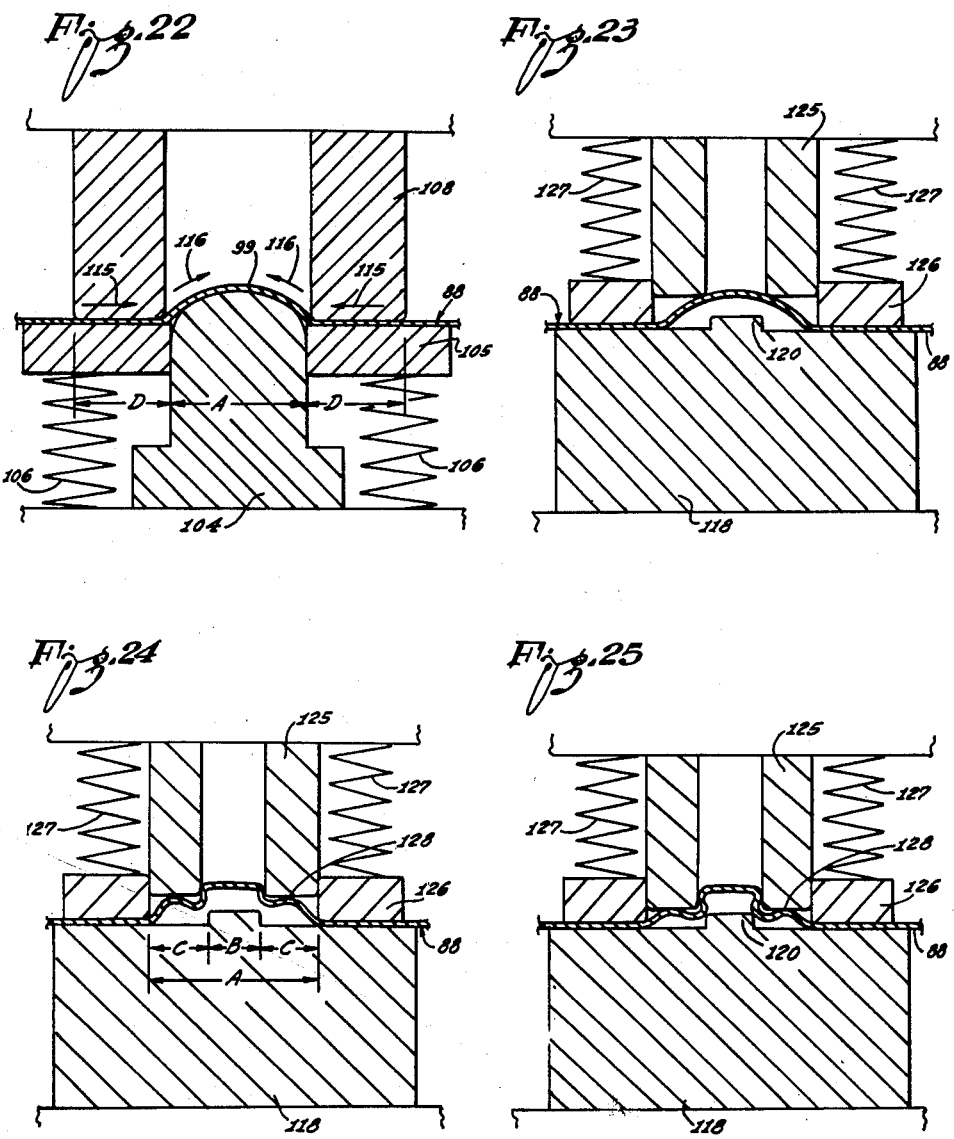

June 29, 1965  E. C. FRAZE  3,191,564
METHOD OF FABRICATING A SHEET METAL JOINT
Filed May 15, 1963  10 Sheets-Sheet 6
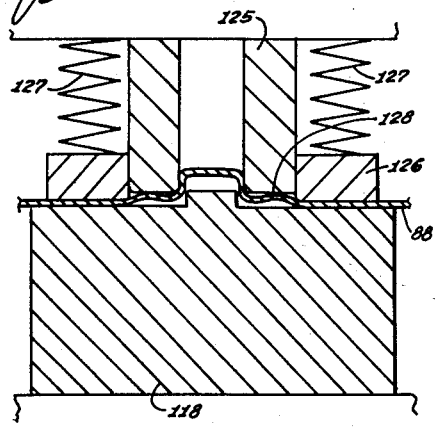
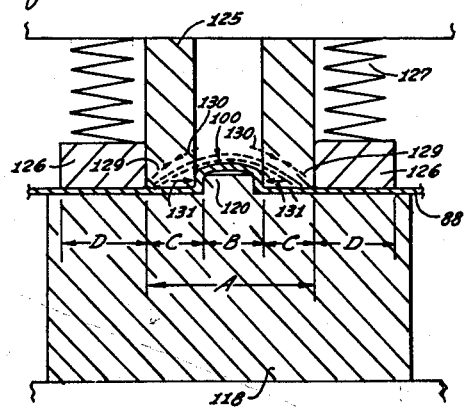
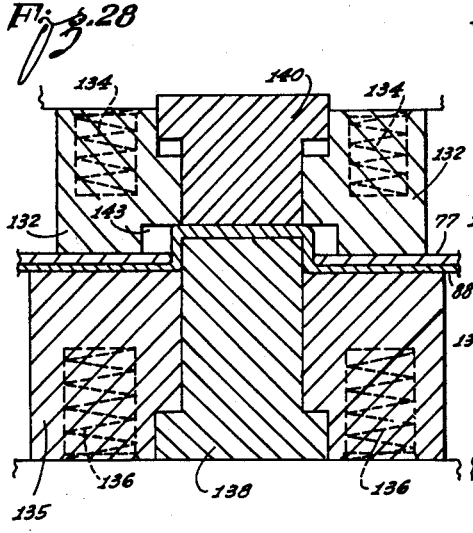
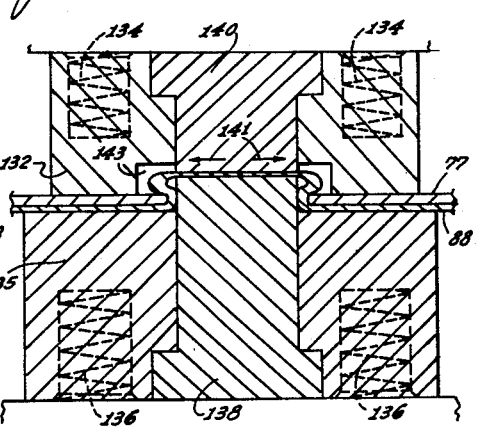
INVENTOR:
Ermal C. Fraze
By Smyth, Roston & Pavitt
Attorneys June 29, 1965 E. C. FRAZE 3,191,564
METHOD OF FABRICATING A SHEET METAL JOINT
Filed May 15, 1963 10 Sheets-Sheet 7
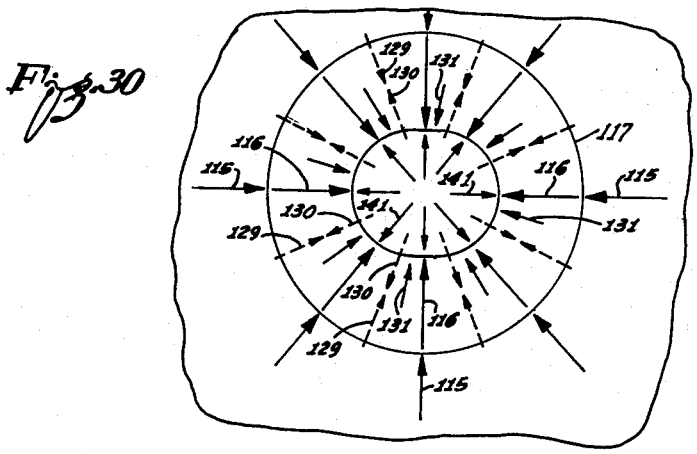
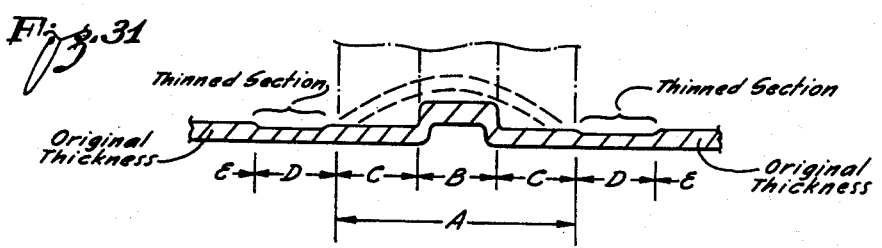
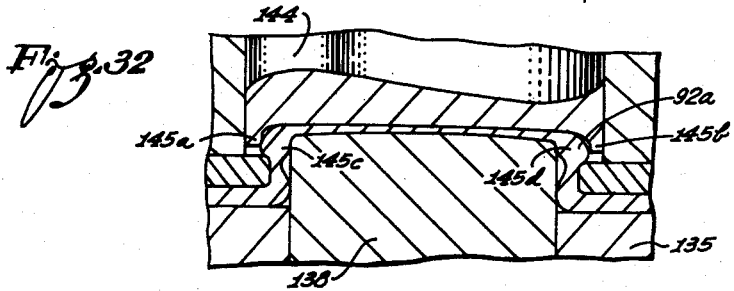
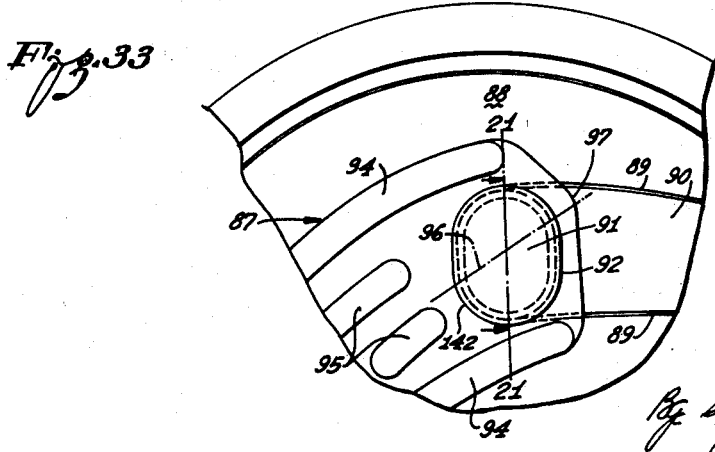
INVENTOR:
Ermal C. Fraze
By Smyth, Rooter & Pavitt
Attorneys June 29, 1965　　　　　E. C. FRAZE　　　　　3,191,564
METHOD OF FABRICATING A SHEET METAL JOINT
Filed May 15, 1963　　　　　　　　　　　　　10 Sheets-Sheet 8
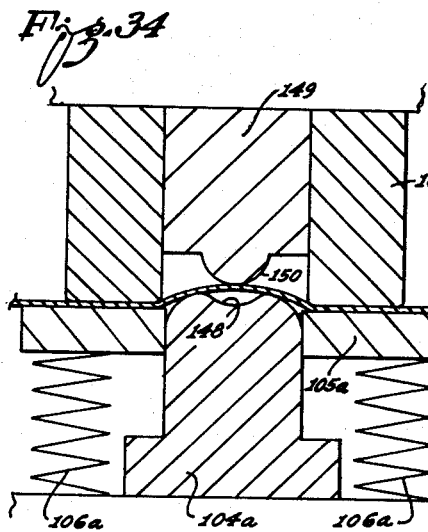
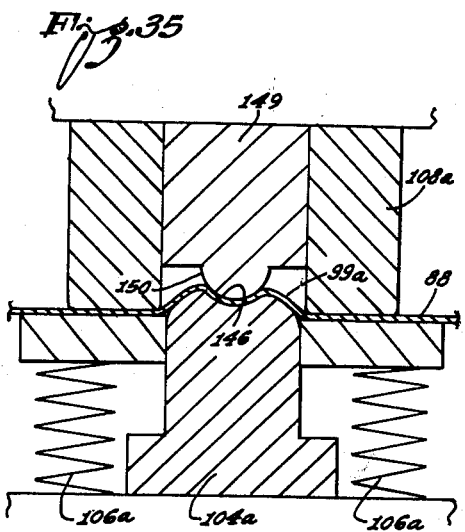
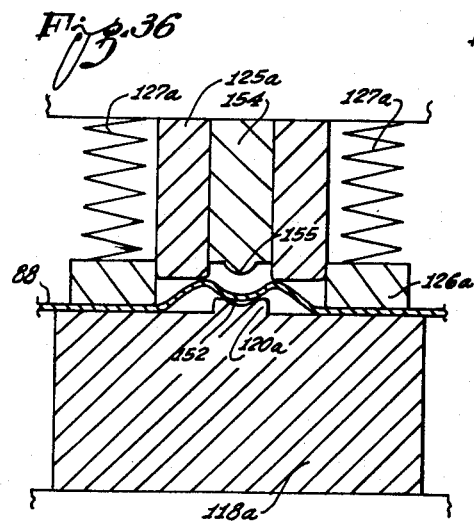
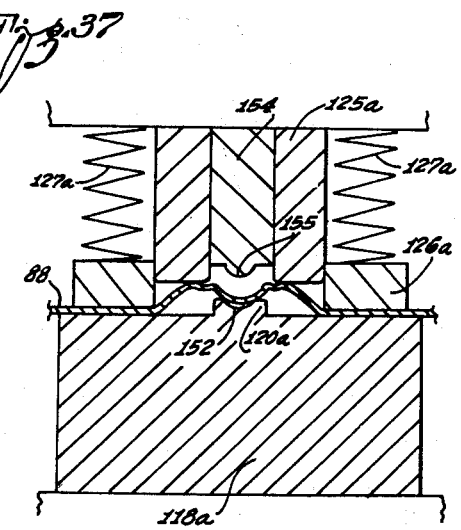

June 29, 1965   E. C. FRAZE   3,191,564
METHOD OF FABRICATING A SHEET METAL JOINT
Filed May 15, 1963   10 Sheets-Sheet 9
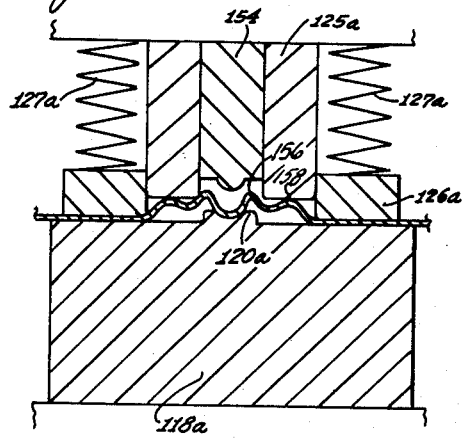
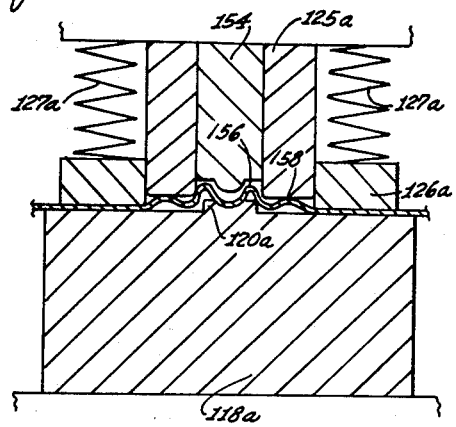
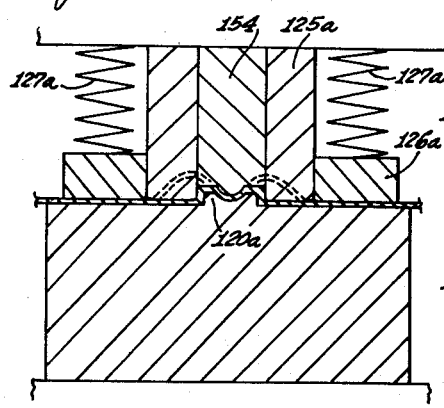
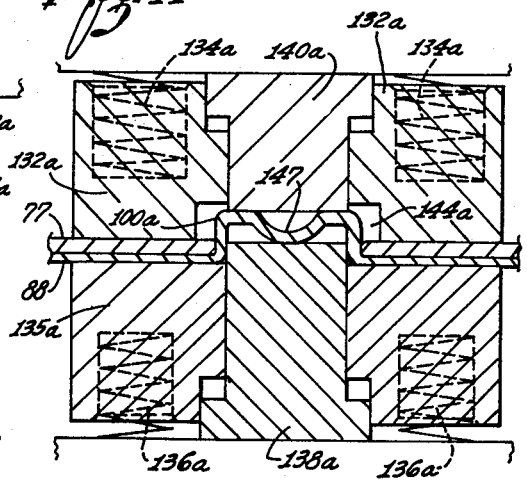
INVENTOR
Ermal C. Fraze
Attorneys June 29, 1965     E. C. FRAZE     3,191,564
METHOD OF FABRICATING A SHEET METAL JOINT
Filed May 15, 1963     10 Sheets-Sheet 10

INVENTOR:
Ermal C. Fraze

Attorneys

United States Patent Office 3,191,564
Patented June 29, 1965

3,191,564
METHOD OF FABRICATING A SHEET METAL JOINT
Ermal C. Fraze, 355 W. Stroop Road, Dayton, Ohio
Filed May 15, 1963, Ser. No. 280,545
10 Claims. (Cl. 113—121)

This application constitutes a continuation-in-part of my application Serial No. 193,060, filed May 2, 1962, now abandoned, for "Sheet Metal Joint and Method and Means of Fabrication," which in turn is a continuation-in-part of my application Serial No. 130,884, filed August 11, 1061, for "Sheet Metal Joint and Method of Fabrication," now abandoned.

This invention relates to a method of attaching a member or device to a sheet of deformable material, and, more particularly, is directed to such a method that does not require any fasteners whatsoever and does not break the continuity of the sheet.

The invention has been initially applied to the fabrication of thin-walled containers having tear strips for opening the containers, the invention being employed to attach tabs to the tear strips. This particular practice of the invention has been selected for the purpose of the present disclosure and will provide adequate guidance for those skilled in the art who may have occasion to apply the underlying principles to other specific purposes.

It is highly desirable to produce sealable cans or containers, for example cans for fruit juices or like beverages, various food products, articles subject to deterioration by the atmosphere, with the tops or end walls of the cans scored to provide tear strips and with tabs attached to the tear strips to serve as handles for severing the tear strips without the use of can openers or like tools. Unfortunately, however, the problem of attaching the tabs to the tear strips in a reliable manner that is satisfactory for mass production has not been heretofore solved.

The use of a separate rivet or like fastener for securing a tab to the tear strip of a can top has been unsatisfactory for a number of reasons, including the important reason that the use of such a fastener necessitates puncturing the can top or wall with the possibility of subsequent leakage. Spot welding techniques have also been proposed but have not been successful for reasons that have plagued spot weld connections for many years.

Attempts have also been made to attach the tabs to the tear strips by cold pressure welding techniques. While the cold pressure welding process has been successful in carefully controlled applications, it has not proved satisfactory in commercial production of cans for a number of reasons. In the first place, the mating surfaces to be pressure welded together must be carefully cleaned and prepared for example, by brush elements that abrade the surfaces to be welded, but such cleaning operations are difficult to carry out successfully by mass production equipment. In the second place, the inner surfaces of cans are commonly necessarily coated with a suitable sealant which is inevitably ruptured by the cold pressure welding process.

The cold weld process also requires that the faying surfaces of the parts be free of any contaminants such as dust or the like, and it has been impossible in mass production operations to insure that the faying surfaces are maintained free of contaminants until joined by the cold weld technique. Experience has shown that such weld joints often fail either because the surfaces were not adequately abraded or because dust or other forms of contaminants interfere with the cold pressure weld operation.

There also have been attempts in the prior art to connect a tab or thin metal lever to a container wall by forming a portion of the container wall into a hollow rivet for engagement with the tab or lever through an aperture thereof. In no instance, however, has the hollow rivet proved strong enough to be depended upon to carry out the metal tearing operation.

The present invention also forms a hollow rivet out of the container wall and is based on the discovery of the cause of the failure of the prior art hollow rivets formed out of container walls as well as the discovery of how to avoid such failure.

One cause of the failure of such a prior art hollow rivet is that in the usual fabrication procedure the total surface area of the finished rivet is so much greater than the area of the container wall from which the rivet is formed that the metal of the rivet is greatly stretched and thinned. Consequently the metal wall of the rivet that must transmit the manual force for the metal tearing operation is of a thickness that is only a fraction of the thickness of the original sheet metal stock from which the container wall is fabricated.

A second and equally important cause is that in prior art procedures the hollow sheet metal rivet is subjected to overall axial compression force in the operation of staking or heading the hollow rivet into positive engagement with the handle tab or lever. The axial compression force collapses the thin metal of the peripheral wall of the hollow rivet, the thin metal wall being crushed and folded upon itself with consequent weakening and destruction of the metal structure.

The present invention presents a number of concepts for dealing with these two causes for prior failures. One concept is to eliminate the first cause by utilizing a greater area of the container wall to form the hollow rivet and thus increase the ratio between the total area of the hollow rivet and the area of the portion of the container wall that is converted into the hollow rivet configuration. Accordingly, the hollow rivet draws on a given area of the container wall that is substantially greater than the area in plan of the finished hollow rivet itself.

In the preferred practice of the invention, a second concept is initially to displace or shift the metal of the container wall from an outer area into this given area before utilizing the metal of the given area to form the hollow rivet. The result of applying these two concepts is that the thickness of the metal of the hollow rivet as well as the thickness of the container wall immediately around the base of the hollow rivet may be substantially the thickness of the original sheet metal stock, or may be even thicker.

A third concept relates to the second cause of failure, i.e., the weakening of the circumferential or peripheral wall of the rivet by the staking operation. This third concept is that the staking operation may be carried out by radially outward displacement of the metal of the outer end wall of the hollow rivet without subjecting the rivet as a whole to axial compression and without destructive crushing of the peripheral wall of the rivet.

Given these new concepts, the problem is presented of how to put the concepts into actual practice. The invention teaches that this problem may be solved by forming the rivet in stages.

The first stage consists of using an area of the container wall that is many times the area in plan of the desired rivet to form a gradually sloped boss or dimple of substantially greater area in plan of the desired rivet and of substantially greater height or axial dimension than the desired rivet. In the preferred practice of the invention, this dimple-forming operation is carried out with freedom for the metal outside the circumference of the dimple to creep into the area of the dimple to avoid or at least to minimize the thinning of the metal that forms the dimple. Since the area of the outer annular zone from which the metal is drawn into the area of the dimple varies with the square of the radial dimension of the annular zone and since that radial dimension is relatively large, the sheet metal of the container in the outer annular zone is thinned to only a slight and insignificant degree.

The second stage consists of collapsing the oversized dimple into a substantially smaller steep-shouldered boss configuration that is to serve as the desired hollow rivet. The central portion of the large dimple forms the hollow rivet proper and the remaining outer radial portion of the dimple forms the flat container wall in the radial zone immediately adjacent the base of the hollow rivet. Thus the large gradually sloped dimple is converted into a hat-shaped configuration, and while the hat-shaped configuration is of the same area in plan as the dimple, it is substantially smaller in actual area or surface area with the consequence that the conversion causes thickening of the sheet metal.

The surface area of the dimple as distinguished from the projected or plan area is substantially larger than the surface area of the hat-shaped configuration into which the dimple is converted and the conversion of the dimple into the hat-shaped configuration is carried out in such manner as to crowd the metal toward the central portion of the dimple that forms the transverse end wall of the rivet, the degree of the crowding action differing with different alloys. Consequently, the transverse end wall of the rivet prior to the staking operation tends to be thicker than the thickness of the sheet metal stock from which the can top is fabricated. In addition, the final step of forming the rivet prior to the staking of the rivet includes the application of impact pressure against the flat metal around the base of the hollow rivet with an extrusion effect that is directed radially inward for further buildup of the rivet proper.

One practice of the invention includes the further concept of forming a reverse curve or curved indentation in the cross sectional configuration of the dimple to increase the extent to which metal is drawn into the dimple area and to increase the ratio between the surface area of the dimple and the surface area of the hat-shaped configuration into which the dimple is converted.

The described first and second stages of the process serve the basic purpose of providing a hollow rivet which is characterized by having an adequate volume of metal to permit the hollow rivet to be staked or deformed into a final configuration in which the metal is of optimum distribution for the strength required in the joint. The final staking step flares the peripheral or cylindrical wall of the rivet into effective overhanging engagement with the rim of the tab aperture through which the rivet extends. To avoid placing the peripheral wall of the rivet under damaging axial compression, the flaring of the outer end portion of the peripheral wall into engagement with the tab is accomplished indirectly instead of directly, i.e., by applying the staking forces to the transverse end wall of the rivet without applying the staking force directly to the peripheral wall of the rivet edgewise thereof, the transverse end wall of the rivet being expanded radially by the staking operation to cause corresponding flaring of the portion of the peripheral wall that is immediately adjacent to the transverse end wall of the rivet.

The radial expansion of the outer end of the rivet may be accomplished by either of two methods of displacing the end wall metal radially outward. One method is initially to form the transverse end wall of the hollow rivet to an arcuate offset configuration to give the transverse end wall a greater surface area than the area in plan of the unstaked rivet and then to flatten the nonplanar end wall to planar configuration with resultant radial expansion and increase in the plan area of the end wall. The other method is to subject the transverse end wall to compression across its thickness to cause the end wall metal to be extruded radially to the desired expanded configurations. Each of these two methods has the desired effect of correspondingly flaring the portion of the peripheral wall of the rivet that immediately adjoins the end wall, thereby forming a peripheral bead which overhangs and engages the aperture of the tab that is employed to remove the tear strip.

While either of these two methods may be used exclusively for staking the rivet, the presently preferred practice of the invention involves both methods. For this purpose the transverse end wall of the rivet is initially arcuately offset from planar configuration and care is taken that the transverse end wall is of substantial thickness. In a single die operation the thick transverse end wall of the rivet is first flattened for initial radial expansion and then is compressed across its thickness for additional radial expansion by radial extrusion of the end wall metal.

In summary, the required strength of the joint between the tab and the metal of the tear strip is achieved by a sequence of steps for displacing metal. First, the sheet metal is drawn into a dimple of many times the plan area of the desired rivet to make available a relatively large area of metal for the rivet-forming operation and the thickness of the dimple metal is conserved by drawing metal from the surrounding outlying area into the dimple area at the cost of only slight thinning effect on the metal in the outlying area. Then the dimple configuration is converted into a hat-shaped configuration of lesser surface area in which the crown portion of the hat-shaped configuration is the desired hollow rivet ready for staking into engagement with the tab.

Three factors are brought into play to build up the rivet in the course of converting the dimple into the hat-shaped configuration. First the collapsing of the dimple configuration into a hat-shaped configuration of substantially less surface area has a crowding effect edgewise of the metal to thicken the metal. Second, the sheet metal of the dimple is guided or directed radially inwardly during the collapsing operation to favor the rivet portion of the hat-shaped configuration. Third, high magnitude impact pressure is applied to the flat metal surrounding the rivet portion of the hat-shaped configuration as a final step with an extrusion effect which is directed radially inward to build up the rivet portion.

When the hollow rivet is subsequently staked into engagement with the tab, the direction of metal movement is reversed. The staking operation expands or spreads the metal of the transverse end wall of the hollow rivet radially outwardly to cause the adjoining portion of the peripheral wall to be correspondingly radially expanded or flared into the desired overhanging engagement with the rim of the aperture in the tab. The impact compression across the thickness of the transverse end wall in the preferred practice of the invention adds further strength to the peripheral wall of the rivet.

The end result is a joint construction in which strength is achieved by novel distribution of the sheet metal of the container wall. The advantage of the novel distribution of the metal of the container wall may be appreciated by considering the stresses created in the manual removal of the tear strip. The bead or head flange of the hollow rivet and the metal adjacent the base of the hollow rivet are both highly stressed in shear and the peripheral or circumferential wall of the hollow rivet is highly stressed in tension. In the new distribution, the bead or head flange of the staked rivet is relatively massive for high shear strength and the peripheral wall is at least approximately gauge thickness of the sheet metal stock from which the can top is fabricated instead of being greatly attenuated and the metal adjacent the base of the hollow rivet is also at least approximately gauge thickness for high shear resistance. In compensation for the added metal in the critical regions, the metal in the outlying region, i.e., the region outside the plan area of the initial dimple, is below gauge thickness and in further compensation the metal of the end wall of the hollow rivet is greatly thinned. The metal can be thinned in these two regions, because neither region is stressed by the operation of removing the tear strip and the web of metal that forms the end wall of the rivet can be thinned so severely because it is of such small diameter, the rivet top being, in effect, a miniature can top.

The invention may be further understood by reference to the following detailed description and the accompanying drawings.

In the drawings, which are to be regarded as merely illustrative:

FIG. 1 is a fragmentary perspective view of a top of a can incorporating a selected embodiment of the invention;

FIG. 2 is a plan view of the same can top;

FIG. 3 is a plan view of the can top after the first operation which consists in forming a sloping boss or dimple in the can top;

FIG. 4 is an enlarged fragmentary cross sectional view showing how the dimple may be formed by die means;

FIG. 5 is a plan view of a can top after the dimple is converted into a hollow rivet in the form of a steep-shouldered boss;

FIG. 6 is an enlarged fragmentary sectional view showing die means that may be used for converting the dimple into a hat-shaped configuration that includes the hollow rivet;

FIG. 7 is a fragmentary perspective view of the lower die in FIG. 6;

FIG. 8 is a plan view of a can top after the scoring operation showing how the hollow rivet is located on the tear strip at the leading end thereof;

FIG. 9 is an enlarged diagrammatic sectional view showing how a scoring die indents the material of the can top;

FIG. 10 is a plan view of one form of a sheet metal tab adapted for attachment to the tear strip;

FIG. 11 is a greatly enlarged section along the line 11—11 of FIG. 10 showing how the tab is embossed to form a rib to reinforce the rim of an aperture in the tab;

FIG. 12 is an enlarged sectional view showing how the tab may be positioned on a can top with the hollow rivet on the can top extending through the aperture of the tab, the view also showing die means for staking the hollow rivet into engagement with the tab;

FIG. 13 is a view similar to FIG. 12 showing the two dies partially closed to positions holding the tab against the can top;

FIG. 14 is a similar view showing the two dies closed further and extruding the metal of the end wall of the hollow rivet radially outward by impact pressure to stake the hollow rivet into permanent engagement with the tab;

FIG. 15 is a plan view similar to FIG. 2 showing another configuration for the hollow rivet;

FIG. 16 is a diagram illustrating the steps in a continuous process for mass production of the can tops;

FIG. 17 is a fragmentary sectional view similar to FIG. 14 illustrating the use of a tab that does not have an embossed rib around its aperture;

FIG. 18 is a greatly enlarged cross sectional view of the dimple that is shown in plan in FIG. 3;

FIG. 19 is a similarly enlarged cross sectional view of the hat-shaped configuration including the hollow rivet into which the dimple is converted;

FIG. 20 is a similar section taken along the line 20—20 of FIG. 19;

FIG. 21 is an enlarged sectional view of a finished joint between a can top and tab without a rim bead, the view being taken along the line 21—21 of FIG. 33;

FIG. 22 is a somewhat diagrammatic sectional view of die means for forming the dimple shown in FIGS. 3 and 18;

FIG. 23 is a similar view showing die means for converting the dimple into the desired hat-shaped configuration, the die means being shown in position to start the forming operation;

FIGS. 24, 25 and 26 are similar views illustrating successive stages in the conversion of the dimple into the desired hat-shaped configuration;

FIG. 27 is a similar view at the completion of the conversion of the dimple into the hat-shaped configuration, the rivet proper being the crown portion of the hat-shaped configuration;

FIG. 28 is a similar view of die means for staking the hollow rivet into permanent engagement with a sheet metal tab, the view showing the die means at the start of the staking operation;

FIG. 29 is a similar view showing the staking operation completed;

FIG. 30 is a diagrammatic view with various arrows indicating how the metal is displaced to form the hollow rivet and how the metal is displaced radially outward in the final staking or heading of the rivet;

FIG. 31 is an enlarged diagrammatic sectional view of a can top with the hollow rivet formed therein showing the relation of the rivet to the dimple from which it is formed and showing how metal is displaced from an annular zone outside the area of the dimple into the area of the dimple with consequent thinning of the metal in the outer annular zone;

FIG. 32 is a fragmentary sectional view showing how the hollow rivet may be staked by another form of die means that limits the radial spread of the bead of the rivet;

FIG. 33 is an enlarged fragmentary plan view of a typical joint structure;

FIG. 34 is a somewhat diagrammatic sectional view of the presently preferred die means for forming a dimple with an indentation in the dimple, the view illustrating an early stage in the operation;

FIG. 35 is a similar view showing the die means at the completion of the dimple-forming operation;

FIG. 36 is a similar view showing the presently preferred die means for converting the indented dimple into the hat-shaped configuration, the die means being shown in position to start the forming operation;

FIGS. 37, 38 and 39 are similar views illustrating successive stages in the conversion of the indented dimple into the desired hat-shaped configuration;

FIG. 40 is a similar view at the completion of the conversion of the indented dimple into the hat-shaped configuration that includes the desired hollow rivet;

FIG. 41 is a similar view of the presently preferred die means for staking the hollow rivet into engagement with a sheet metal tab, the view showing the die means at the start of the staking operation;

Figure 42:
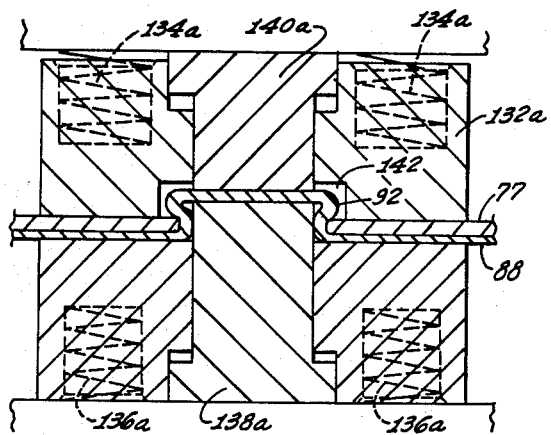
FIG. 42 is a similar view showing a later stage in the staking operation.

FIG. 1 illustrates a presently preferred embodiment of the invention in which a can, generally designated 20, made of a suitable alloy, has at one end thereof, a can top or end wall 22 also formed of a suitable alloy, with a suitable coating of a sealant on its inner surface. Typically, such containers are manufactured from an appropriate alloy of aluminum or steel, the construction being influenced by the product from which the container is designed. The can top 22 is scored along a line 24 that is looped to form a tear strip 25 of a spiral-like configuration extending around the circumference of the can top so that removal of the tear strip severs substantially the entire can top from the can. The tear strip 25 has a leading end indicated at 26 in FIG. 2 and one end of a thin tab or flat sheet metal lever 28 of a suitable metal is attached to the leading end of the tear strip to serve as a handle member for manual removal of the tear strip. The tab 28 is normally engaged with the sheet metal of the can top 22 in face-to-face relation and thus does not interfere with normal stacking of the cans for shipment or display.

In this particular embodiment of the invention, the tab 28 is formed with an aperture 30 forming a transverse straight edge 31 to provide a transverse line of weakness where the tab will bend easily. In the operation of removing the tear strip 25 the end of the tab 28 is bent upwardly along the straight edge 31 to serve as a handle or finger piece to cause the tab to pry loose the leading end of the strip and then to sever the tear strip progressively.

As best shown in FIG. 10, the tab 28 is formed with an aperture 32 to receive a hollow rivet formed out of the material of the can top and in this instance, as best shown in FIG. 11, the aperture 32 is surrounded by an embossed rib 34 which reinforces the rim of the aperture. It is also to be noted in FIG. 11 that the inner circumferential portion 35 of the aperture 32 is tapered or conical in form. In the finished can top shown in FIGS. 1 and 2, a hollow rivet 36 in the form of a steep-shouldered sheet metal boss formed out of the material of the can top 22 extends through the aperture 32 of the tab 28 and is headed or staked to form a bead-like radial flange 36a overlying the top surface of the tab to clamp the tab against the tear strip 25. The resulting joint between the tab 28 and the can top 22 is best shown in FIG. 14 and FIG. 17 where it is seen that the staked rivet 36 fits snugly with the flared aperture 32 of the tab. The operations of forming and staking the rivet are carried out without rupturing the sealant coating on the inner face of the can top.

As heretofore stated, the hollow rivet 36 is formed in two stages, the first forming stage resulting in a sloping-shouldered boss or a dimple 40 that is shown in plan in FIG. 3. FIG. 4 shows schematically how the dimple 40 may be formed by means of an upper female die 42 and a cooperating male die 44. The upper die 42 has a circular recess 45 of the diameter desired for the dimple and the die 44 is formed with a curved nose 46 that offsets the metal of the can top 22 into the recess 45. It is to be noted that the dimple 40 is of many times the area of the desired hollow rivet 36 and is also of greater height.

In the second stage the dimple 40 is placed between an upper die 48 and a lower die 50 shown in FIG. 6 to change the dimple configuration into a hat-shaped configuration. The upper die 48 has a flat annular leading face 52 and has a central cavity 54 of the shape in plan of the desired hollow rivet. The lower die 50 has a flat working face 55 and has a projection 56 of the desired internal configuration of the hollow rivet. It is to be noted that the clearance between the inner peripheral surface of the cavity 54 and the peripheral surface of the projection 56 is of sufficient magnitude to avoid any thinning or drawing effect on the peripheral wall of the hollow rivet and it is to be noted also that the cavity is of such depth that the upper surface of the transverse wall 37 of the hollow rivet is unrestrained. In other words, the metal ultimately forming the transverse or end wall of the rivet 36 is free to move into the cavity 54 and no wall surface of the cavity shapes the final configuration of the transverse or end wall of the rivet. When the two dies 48 and 50 close together, they convert the relatively large dimple 40 into a hat-shaped configuration in which the crown portion of the hat-shaped configuration is the hollow rivet 36. As may be seen in FIG. 5 the hollow rivet 36 is oval in shape to conform to the oval shape of the previously mentioned aperture 32 of the tab 28.

After the hollow rivet 36 is formed in the can top 22 at the location shown in FIG. 5, the can top is scored to form the tear strip 25 with the hollow rivet 36 at the leading end of the tear strip as shown in FIG. 8. To form the tear strip, the can top 22 may be positioned on a solid metal support 60 in the manner shown in FIG. 9 and a suitable scoring tool 62 may be employed to score the metal along the score line 24 to form the spiral-shaped tear strip without rupturing the sealant coat on the inner surface of the can top. If the thickness of the can top 22 is on the order of 0.008 inch thick, the metal may be scored to a depth of 0.005 inch. The depth of the score, however, will to some extent depend upon the alloy used and the type of product to be confined by the can.

To stake the hollow rivet 36 into permanent effective engagement with the tab 28, the can top 22 is positioned on a lower die 64 in the manner shown in FIG. 12 with an anvil portion 65 of the lower die fitting into and filling the interior of the hollow rivet 36. The tab 28 is then positioned on the can top 22 in a position at which the hollow rivet 36 extends through the aperture 32 of the tab as shown. The lower die 64 and a cooperating upper die 66 are then operated to forcibly decrease the thickness of the transverse wall 37 of the hollow rivet 36 by impact action. The upper die 66 consists of a ram or plunger 68 and a spring-loaded annular die member 70, the die 66 being slidably mounted in a bore 72 of the die member 70. In FIGS. 12 and 13, the configuration of the plunger 68 and the bore 72 conform to the configuration of the hollow rivet 36 but in the practice of the invention illustrated by FIG. 14, the cross sectional configuration of the plunger 68 and the bore 72 is slightly larger than the the cross sectional configuration of the hollow rivet. The bore 72 terminates in a counter bore or recess 74 which is dimensioned to clear the rib 34 of the tab 28 as may be seen in FIGS. 13 and 14.

In the staking operation, the die member 70 and the lower die 64 close towards each other as shown in FIG. 13 to initially press the tab 28 firmly against the can top 22 in the region surrounding the hollow rivet 36. With the tab 28 held firmly against the can top 22 the ram or plunger 68 is driven at high velocity relative to the lower die 64 for an impact or hammer blow against the transverse wall 37 of the boss 36. As a result, the metal of the transverse wall 37 of the hollow rivet 36 is forced radially outward into engagement with the inwardly facing surface of the rib 34 around the aperture 32. The impact force is of sufficient magnitude to cause the metal of the wall 37 of the hollow rivet to flow outwardly in all radial directions as indicated by the arrows 75 in FIG. 14, with consequent forcible flaring of the adjoining portion of the peripheral wall of the radial bead or flange 36a in engagement with the tab 28 around the rim of the tab aperture 32.

While the reinforcing rib 34 of the tab 28 is advantageous in strengthening the joint and adding rigidity to the tab in the region of the aperture 32, the reinforcing rib 34 can be omitted. If the rib 34 is omitted, the counter bore or recess 74 of the die member 70 is reduced in diameter as shown in FIG. 17. The staking operation is the same however, the resulting bead 36a overlying the flat rim of the aperture 32 as shown in FIG. 17 with the peripheral wall 38 of the hollow rivet engaged with the tapered rim portion 35.

It has been found in practice that the beveling or flaring of the rim portion 35 around the aperture 32 of the tab has the advantage of eliminating any tendency for the rim of the aperture 32 to pierce or rupture the peripheral wall 38 of the hollow rivet in the final die operation shown in FIG. 14. In FIG. 17 the rim portion of the aperture is flared by a coining operation which bevels the edge of the metal. In FIGS. 12 to 14 the flared configuration of the aperture in the tab is formed largely by the embossed reinforcing rib 34.

FIG. 15 shows a can top 22' of the same character as the can top 22 of FIGS. 1 and 2. In FIG. 15 the aperture of the tab 28' and the hollow rivet 36' that extends through the aperture both have the configuration of a circle with a segment removed. Thus the configuration of the hollow rivet 36' like the configuration of the hollow rivet 36, is non-circular for positive prevention of rotation of the tab about the hollow rivet. It is to be understood, however, that the hollow rivet may be of circular configuration or any other suitable configuration.

FIG. 16 shows diagrammatically how the method can be carried out on a mass production basis. At a first station in FIG. 16 a long sheet 76 of aluminum alloy, cut to the configuration shown and coated with a suitable sealant, is advanced step by step through a plurality of forming dies, which stamp or emboss the can top configurations 78 in the sheet without severing the can top configurations from the sheet. At the next station, a plurality of dies of the character shown in FIG. 4 form dimples 40 in the can top configurations 78. At the third station, the dimples 40 are converted into hat-shaped configurations to form the hollow rivets 36, the operation being carried out by a plurality of dies of the character shown in FIGS. 6 and 7. A plurality of dies at the next station score the can top configurations 78 to form the tear strips 25.

In the meantime, a strip 82 of a suitable metal, which may be of a thickness of .015 inch, is processed in one or more stages to form embossed tab configurations 84 in the sheet. Each tab configuration has the previously mentioned aperture 30 to facilitate proper bending of the tab and the previously mentioned rib-reinforcing aperture 32 to receive the steep-shouldered boss 36 of the can top 22. At the fifth station in the progress of the sheet 76, the tab configurations 84 are punched out of the strip 82 to provide the desired tabs 28, the tabs being delivered from the cutting dies onto the hollow rivets 36 of the sheet 76 as indicated by the dotted lines 85 in FIG. 16. At the sixth station, the hollow rivets 36 are staked by a plurality of dies of the character shown in FIGS. 12, 13 and 14 to clamp the tabs 28 firmly in place on the tear strips 25. At the next station, the can top configurations 78 are punched out of the sheet 76 to produce the separate or individual can tops 22. Finally, the can tops 22 are subjected to an edge curling operation by well known means 86 which curls the peripheral edges of the can tops in preparation for attaching the can tops to cylindrical can bodies.

It is apparent in considering the disclosure of FIGS. 1 to 16, inclusive, that a unique method of attaching a first sheet-like element to a second sheet-like element, for example, a tab or key to a can wall or can top, has been provided, as well as a novel resultant article. Specifically reviewing the illustrated disclosure, it will be noted that the second sheet-like element, namely, the can top, is initially formed at a preselected location thereon, with a generally conical dimple or bubble-like deformation, after which the dimple or conical deformation is importantly reduced in all its dimensions and reformed into a steep-sided boss or hollow rivet of a height greater than the thickness of the first element, that is, the tab or key, and of a cross-sectional size and shape substantially equal to the size and shape of an aperture formed in the first element.

This arrangement permits the first element to be superimposed on the second with the hollow rivet extending through the aperture of the first element. At this stage of the practice of the disclosed invention, the hollow rivet has been formed with a transverse wall thereof greater in thickness than the wall of the initially formed dimple. With the hollow rivet extending through the aperture, the transverse wall or end wall of the hollow rivet can be forcibly decreased to displace outwardly sufficient material of the wall, while rigidly supporting the wall above the first element, to form the annular bead having a wall thickness greater than the now-thinned transverse wall, and overlying and engaging the defining edge portion of the aperture to thereby effect positive joinder between the elements. It should be noted that the thickness of the bead wall progressively increases from a point spaced inwardly of the peripheral edge thereof and the progressive thickening continues into the upstanding peripheral wall of the hollow rivet that is engaged with the wall of the aperture of the tab.

A practice of the invention will now be described in more detail to produce the joint structure shown in the fragmentary plan view in FIG. 33. In FIG. 33 a tab 87 is attached to a can top 88 which is scored along the line 89 to form a tear strip 90, the tab being anchored by a staked hollow rivet 91 formed in the sheet metal of the can top. The staked rivet 91 has the usual radial bead 92 which overlaps and positively engages the rim of an aperture in the tab 87.

The tab 87 is reinforced for stiffness by a pair of relatively long longitudinal ribs 94 along its opposite edges and a pair of shorter ribs 95 so that the tab is rigid throughout its length to serve as a rigid lever for initiating the tearing of the strip 90 by an advantageous leverage or prying action. The tab 87 may be considered as having a longitudinal axis indicated by the line 96 which terminates at the fulcrum end of the tab, the fulcrum end being tapered to form a fulcrum nose 97.

When the tab 87 is lifted in the manner of a stiff lever, the force application is along the longitudinal axis 96 to the fulcrum nose 97 and since the fulcrum nose is exceedingly close to the staked rivet 91, the force applied to the free end of the lever or tab is greatly multiplied in the prying action on the staked rivet. It is to be further noted that the longitudinal axis 96 extends diagonally of the oval-shaped staked rivet 91, the divergence of the score line 89 in opposite directions away from the region of the corner portion greatly facilitating the initiation of the tearing action.

As heretofore described, the process of forming the joint between the tab 87 and the can top 88 is carried out through successive stages. In the first stage, a dimple 99 is formed of the cross sectional configuration shown in FIG. 18, which is taken from a photomicrograph of a cross section of the formed rivet; in the second stage the dimple configuration is converted into a hat-shaped configuration shown in FIGS. 19 and 20 which are also taken from photomicrographs and in which the crown portion of the hat-shaped configuration is the unstaked rivet 100; and finally, the unstaked rivet 100 is staked into engagement with the tab 87, FIG. 21, which is also taken from a photomicrograph showing the staked rivet 91 extending through an aperture 101 of the tab 87 with the radial bead 92 of the staked rivet clamping the rim of the tab aperture against the can top 88. It is to be noted that the dimple 99 is of many times the area in plan of the unstaked rivet 100 and is also of a greater height.

It will be noted that the transverse wall 102 of the hollow unstaked rivet 100 is for practical purposes of generally uniform thickness. Additionally, and as a result of the metal flow described in the rivet-forming operation, the transverse wall or end wall 102 of the rivet is provided with a thickness that is importantly thicker than the wall thickness of the dimple 99. Depending somewhat on the particular metal utilized, the wall 102 may not only be thickened but also slightly crowned as seen in cross section by the provision of a suitable surface on the male forming member of the lower die element.

It will be understood, however, that the thickening of the wall 102 should be considered relative to the thickness of the wall of the dimple 99 as well as the original thickness of the sheet metal stock of the can top 88 and that the re-formed thickness of the wall 102 may vary slightly depending upon the material used, as well as the original thickness of the can top 88. Thus, in the preferred form of the invention, the rivet 100 comprises a hollow member offset from the general plane of the can top 88 and having a vertical length measured from the surface of the can top 88 to the upper surface of the transverse wall 102 greater than the thickness of the herein referred to tab or key 87, and particularly the thickness of the tab in the area of the defining edge portion of the aperture 101.

In this particular practice of the invention the dimple 99 is formed by die means in the manner shown in FIG. 22. The size of the dimple for forming a given hollow rivet will depend on the alloy used for the can top. A lower male die 104 is formed with the usual rounded nose and is surrounded by a pressure pad 105 which is acted upon by relatively light pressure springs 106. An upper female die 108 is of an inside diameter to receive the lower die 104 with appropriate clearance for the sheet material that is being formed.

In the initial stage of forming the dimple 99, the pressure pad 105 holds the metal of the can top 88 above the plane of the nose of the lower male die 104 and then the dies close to create the dimple 99. The pressure pad 105 retreats in the course of this forming operation under the pressure of the upper die 108 to cause the sheet metal of the can top to be offset and drawn over the nose of the lower die 104.

It is important that adequate clearance be provided to avoid squeezing or trapping the metal and for this reason the shoulder of the lower die 104 is rounded as shown. It is also important that the pressure exerted by the pressure pad 105 under the force of the springs 106 is relatively light pressure that freely permits the sheetmetal to creep radially inwardly from the annular region of the pressure pad into the region of the nose of the lower male die 104. Under some conditions no pressure pads are necessary. Consequently the metal creeps inwardly to the lower die 104 with minimum stretching and thinning of the sheet metal as the lower die offsets the sheet metal into the cavity of the upper die.

The freedom for slippage of the sheet metal into the zone of the dimple 99 minimizes the thinning of the sheet metal of the dimple at the expense of thinning the metal in the outlying annular region of the female die 108. In FIG. 22 the area in plan of the dimple 99, i.e., the cross-sectional area of the lower male die 104 is designated A and the surrounding area in the region of the female die 108 is designated D. The arrows 115 and 116 in FIG. 22 and the corresponding arrows 115 and 116 in FIG. 30 represent this radially inward displacement of the sheet metal from the annular region D into the region A of the dimple 99. In FIG. 30, the area of plan of the dimple 99 is indicated by the circle 117 and the area in plan of the unstaked rivet 100 is indicated by a solid line, which is somewhat oval in plan. FIG. 31 indicates in a somewhat exaggerated manner the thinning of the metal in the annular zone D to less than the thickness of the sheet metal stock from which the can top is made.

The second state of converting the dimple 99 into a hat-shaped configuration of substantially smaller surface area is carried out by die means in the manner illustrated by FIGS. 23 to 27. In these figures a lower die block 118 is formed with a projection 120 of the desired inside configuration of the unstaked hollow rivet.

The complementary upper die means includes an annular female die 125 surrounded by an upper pressure pad 126 which has cooperating pressure springs 127. It is important to note that for this second stage in the forming of the sheet metal, the springs 127 are strong enough to cause the pressure pad 126 to clamp the sheet metal of the can top 88 against the lower die block 118 in a positive manner that prevents any slippage of the sheet metal radially outwardly from the zone of the dimple. It is also important to note that the inside diameter of the upper female die 125 is sufficiently larger than the diameter of the die projection 120 to provide ample clearance for the sheet metal around the periphery of the projection and thus avoid any tendency to draw the sheet metal as it is formed around the periphery of the die projection.

As the upper and lower dies close together, the sheet metal of the dimple 99 behaves in the manner shown in FIGS. 23 to 27. As indicated in FIG 27, the previously mentioned area A of the dimple 99 is converted into a hat-shaped configuration in which the area in plan of the crown portion of the hat-shaped configuration, i.e. the area in plan of the unstaked rivet 100 is designated B, and the surrounding annular flat or brim portion of the hat-shaped configuration is designated C, these two areas in plan being equal to the plan area A of the dimple 99 that is converted into the hat-shaped configuration.

It is to be especially noted that while the two plan areas are equal, the surface area of the hat-shaped configuration is, in this instance, substantially less than the surface area of the dimple 99 with the consequence that the sheet metal is crowded edgewise in the course of the conversion with consequent thickening of the sheet metal that ultimately assumes the hat-shaped configuration.

A feature of the invention is that because of the initial configuration of the dimple and because of the configuration of the die means in FIGS. 23 to 27, the thickening of the sheet metal occurs in a selective manner to favor thickening of the sheet metal in the particular regions where thickening is most desirable to tend to eliminate the possibility of fracture of the metal. In the initial deformation of the dimple shown in FIGS. 24 and 25, the dimple is deformed with a ripple effect as the excess metal presented by the large dimple is forced downwardly and inwardly by the female die 125 as it is urged against the dimple. Thus as shown in FIG. 24, the excess metal of the dimple at this stage provides an annular shoulder or ripple 128 outside the circumference of the die projection 120 in the annular zone C.

FIGS. 25 and 26 show progressive flattening of the annular ripple 128 by the female die 125 and FIG. 27 shows the annular ripple completely flattened and the rivet completely formed.

Since the sheet metal in the outer annular zone D is immobilized by the heavy pressure of the pressure pad 126, the displacement of the excess metal producing the annular ripple 128 is desirably radially inwardly towards the die projection 120 to increase the thickness of the metal of the peripheral and transverse walls of the rivet, the annular clearance between the upper female die 125 and the lower die projection 120 being ample to permit this desired thickening effect. This crowding effect on the sheet metal in opposite radial directions as the dimple 99 is converted into the hat-shaped configuration, is indicated by the opposed pairs of arrows 129 and 130 shown in dotted lines in FIG. 27 and the corresponding opposed pairs of arrows 129 and 130 shown in dotted lines in FIG. 30.

In FIG. 27 the final closing of the upper female die 125 against the lower die 118 is accomplished with a forceful impact which spanks the metal and here again, since the sheet metal in the outer area D is under heavy pressure from the presure pad 126, the consequent displacement of the sheet metal by extrusion is radially inward for further reinforcement of the periphery of the hollow rivet 100 at its base. This radially inward displacement of the metal by impact extrusion, indicated by the arrows 131 shown in solid lines in FIG. 27 and by the corresponding arrows 131 shown in solid lines in FIG. 30, not only thickens the peripheral wall of the rivet but also the transverse wall.

In the absence of the impact extrusion, the metal in the annular zone C may be substantially thicker than the original gauge thickness of the metal. In other words, the crowding of the metal edgewise by the conversion of the dimple into the hat-shaped configuration of lesser surface area may actually overcompensate for any slight thinning of the sheet metal of the dimple that may occur in the forming of the dimple. The impact extrusion of the metal from the annular zone C, however, results in the final thickness of the metal in this zone being approximately the original gauge thickness of the sheet metal.

It should be stressed here that the defining edge of the cavity in the lower face of the femal die 125 is not a draw radius and no drawing of the metal occurs as the metal is urged upwardly into the cavity. As has been previously explained, the metal urged into the cavity of the die 125 is not confined by any die surface other than the wall elements which shape and size the peripheral wall of the rivet formed. No die surface is present in the tooling which limits the upward movement of the metal into the cavity of the female die and consequently the metal which forms the transverse or end wall of the rivet is free to move without restraint to its ultimate or final position. This permits, as should now be fully understood, a maximum thickening of the transverse or end wall of the insert formed.

After the unstaked rivet 100 is formed in the manner described, the can top is then scored to form the tear strip 90 with the hollow unstaked rivet 100 at the leading end of the tear strip, FIG. 3, best showing the location of the rivet relative to the tear strip. After the hollow rivet 100 is formed and the metal of the can top is scored, the tab 87 is placed at its assembled position with the unstaked hollow rivet 100 extending through the aperture 101 of the tab as shown in FIG. 28 and then the rivet is staked into positive engagement with the tab in the manner shown in FIGS. 28 and 29. In this staking operation, the tab 87 and the metal of the can top outside the diameter of the rivet 100 are clamped between an upper pressure pad 132 acted upon by upper springs 134 and a lower pressure pad 135 acted upon by lower springs 136, the springs being relatively heavy springs. The lower pressure pad 135 surrounds a male die or anvil 138 which is dimensioned to telescope into the interior of the hollow rivet 100 and is adapted to cooperate with an upper impact die 140 of substantially the same diameter.

As the two dies 138 and 140 start to close, they are in the position shown in FIG. 28 with the anvil 138 abutting the underside of the end wall of the rivet and with the impact die 140 abutting the upper surface of the end wall. The closing action of the two dies 138 and 140 continues with high magnitude impact force to thin the end wall of the rivet and extrude the metal of the end wall radially outward to complete the formation of the radial bead 92 and to convert the radial bead 92 to the final configuration shown in FIG. 21 for effective positive engagement with the tab 87. This final radial displacement of the metal of the end wall of the rivet by extrusion of the end wall metal is indicated by the arrows 141 shown in solid lines in FIG. 29 and by the corresponding arrows 141 shown in solid lines in FIG. 30. It is apparent in FIG. 21 that the end wall 102 of the staked rivet is substantially thinner than the rest of the rivet and is much thinner than the thickness of the sheet metal stock from which the can top is fabricated. It also can be seen that the thickness of the wall of the staked rivet progressively increases from the region of the end wall through the bead and into the peripheral wall of the rivet.

It is to be particularly noted that the dimension X in FIG. 19 and the dimension Y in FIG. 21 are substantially equal. The significance of this fact is that the final staking operation which results in the configuration shown in FIG. 21 does not shorten the peripheral wall of the rivet nor crush the peripheral wall as would occur if the whole rivet were compressed axially in the usual manner. It is to be noted that the two edges 101a and 101b of the rim of the aperture 101 are chamfered or rounded to a radius. The aperture may be processed by coining dies to produce the rounded edges, preferably at a radius of 0.005 inch. The rounding of the edges eliminates any tendency for the rim to cut or damage the metal of the hollow rivet in the staking operation.

The distribution of the metal prior to the staking operation is shown diagrammaticaly in FIG. 31. In the outlying zone E the sheet metal is of the gauge of the stock from which the can top is fabricated; in the annular zone D the sheet metal is thinner than the gauge stock and in the inner annular zone C the thickness of the metal is at least approximately gauge thickness; the metal of the end wall of the unstaked rivet in the zone C is greater than gauge thickness. When the rivet is staked, the thickness of the end wall of the rivet may be on the order of 30 to 50 percent of the original gauge thickness. As heretofore stated, the relatively thin web of metal that forms the rivet top is of adequate strength to withstand the internal pressure of the usual container with a large safety factor because the diameter of this web is relatively small.

The impacting force, as should now be understood, is utilized to induce radially outward metal flow creating the circumscribing bead 92 overlying the edge portion of the tab aperture 101. As a result of the formation of the hollow bead 92, the peripheral wall of the hollow rivet is generally curved as seen in cross section, whereby the bead 92, the peripheral wall of the rivet and the can top 88 comprise a re-entrant section receiving the defining edge portion of the aperture of the tab or key. In the preferred practice of the invention, the transverse wall 102 should not be thinned to an extent greater than the thinning incident to the formation of the score lines in the can top earlier described.

From the standpoint of a practical teaching of the invention, it will be understood that the force of the impact blow should reasonably be carefully controlled. This is especially true where the can top is of a relatively high ductile metal such as many of the aluminum alloys currently employed in container use. If the impact blow is without sufficient force, radial outward flow of the metal will be incomplete and proper bead interlock will not be achieved. On the other hand, excessive impact force may induce a radial flow to a degree greater than that which provides optimum tab connection.

FIG. 21 is illustrative of a typical optimum quality bead connection, and it will be noted that the wall thickness of the outwardly directed circumscribing bead 92 is substantially greater than the thickness of the transverse wall 102. In fact, the peripheral wall of the hollow rivet at the bead 92 is increased in thickness as a result of the metal flow produced by the impact blow.

In FIG. 33 it can be seen that the staked hollow rivet 91 is elongated in plan configuration and that the longitudinal axis of the tab 87 extends diagonally of the rivet substantially in alignment with the fulcrum point 97, where the reaction to the prying force is applied. It is apparent that the initial lifting force is concentrated in the region of the rivet indicated by numeral 142 at a point on the end of the tear strip that is diagonally opposite from the fulcrum point. The fact that the rivet is very close to this point on the score line and the fact that the score line diverges from this point, are both conducive to initiation of the tearing action by relatively little prying force.

It has been found that an improved rivet bead 92 is produced if the freedom for the extruded metal to flow radially is limited in a positive manner. In FIGS. 28 29 the upper pressure pad 132 is cut away to provide an annular space 143 into which the metal may be displaced in the staking operation. In these figures the annular space 143 is relatively large and does not limit the radial displacement of the metal in the staking operation. It is obvious, however, that the annular space 143 may be made of smaller diameter to limit the radial displacement. FIG. 32 shows how a somewhat similar effect may be achieved by substituting an upper impact die 144 for the upper impact die 140 in FIGS. 28 and 29. The upper impact die 144 is formed with a pair of opposed approximately linear downwardly projecting abutments or flanges 145a and 145b. The presence of the abutments or flanges 145a and 145b on the opposed sides of the rivet inhibit outward flow whereby in these regions of the rivet the resultant material flow forms thickened bars 145c and 145d. The bars 145c and 145d, of course, extend in generally parallel relationship along the opposed side of the jointure and act as reinforcing members to strengthen the rivet connection, especially during the application of the load required for the can opening operation. With this in mind, it is preferable that the bars 145c and 145d be formed in generally parallel relation to the line of motion of the tab of the lever during the tear strip removal.

It will also be understood that the teaching of FIG. 32 may be employed as an alternate to the other described teaching, depending upon such considerations as rivet size and initial thickness of the original can top material.

It is important to note in FIGS. 28 and 29, as well as in FIG. 32, that the two opposed dies compress the end wall of the hollow rivet across the thickness of the end wall in an area which is limited to the area of the inside surface of the end wall of the unstaked rivet. It is also important to note that the staking operation is carried out in a plane that is spaced substantially outward from the plane of the tab and is the plane of the end wall of the hollow rivet before the rivet is staked. Thus in FIGS. 29 and 32 the upper working face of the lower die 138 is in a plane spaced substantially from the outer face of the tab, this plane being the plane of the end wall of the unstaked rivet. It is apparent that the staking operation is carried out without subjecting the peripheral wall of the rivet to destructive axial compression.

FIGS. 34 to 43 show different stages in a variant of the presently preferred method of making the same joint that is shown in FIG. 3. The dies shown in these views are largely identical with the dies in the previously described views in FIGS. 22 to 29 as indicated by the use of corresponding numerals to indicate corresponding parts.

The important feature of this practice of the invention is that it provides for greater displacement of sheet metal by the effect of straightening curvatures in the metal, the metal displacement being directed to strengthening of the rivet. For this purpose the first stage of the operation forms a dimple 99a shown in cross section in FIG. 35, the dimple being characterized by a central indentation 146 which gives the dimple a rippled configuration in cross section. For the same purpose, as best shown in FIG. 41, the rivet 100a into which the dimple 99a is converted has a central indentation 147.

For the purpose of forming the indentation 146 in the dimple 99a, the lower male die 104a is formed with a corresponding indentation 148 in its nose as shown in FIG. 34 and an upper die member 149 is provided inside the upper female die 108a to cooperate with the lower male die for forming the indentation. For this purpose the upper die member 149 has a rounded projection 150 which cooperates with the indentation 148 in the lower male die member 104a in the manner shown in FIG. 35.

To form the indentation 147 in the rivet 100a, the dies for converting the dimple 99a into a hat-shaped configuration are constructed as shown in FIGS. 36 to 40. The projection 120a of the lower die 118a is formed with a central indentation 152 and an upper die 154 is added that has a rounded projection 155 to cooperate with the indentation 152.

The conversion of the dimple 99a into the hat-shaped configuration is accomplished in the same general manner as heretofore described, but the indentation 146 in the dimple 99a causes two annular ripples to be formed and to be flattened out in the course of the conversion, instead of a single annular ripple. Thus FIGS. 38 and 39 show an inner annular ripple 156 within the area of the die projection 120a and a second outer annular ripple 158 within the annular area of the upper female die 125a. In contrast, the previously described FIGS. 24 and 25 show only the single outer annular ripple 128. It is apparent that a flattening action on the two annular ripples results in greater edgewise displacement of the metal than a flattening action on a single annular ripple.

FIG. 41 shows the resulting rivet 100a with the central indentation 147 ready to be acted upon by a lower anvil member 138a and an upper impact member 140a. As the two die members 138a and 140a close together, they first flatten out the indentation 147 as may be seen in FIG. 42, with consequent desirable radial displacement of the metal to partially form the desired bead 92. It is to be noted that because of the indentation 147, the end wall of the unstaked rivet has a surface area that exceeds the area in plan of the rivet. The resulting radial expansion of the transverse end wall causes corresponding radial expansion of the adjoining portion of the peripheral wall, the peripheral wall being flared outward to form the bead 92. Since the bead 92 is in effective overhanging engagement with the rim of the aperture 101 of the tab 87, it is apparent that, if desired, the staking operation may be terminated at this point to provide an effective joint.

Figure 43:
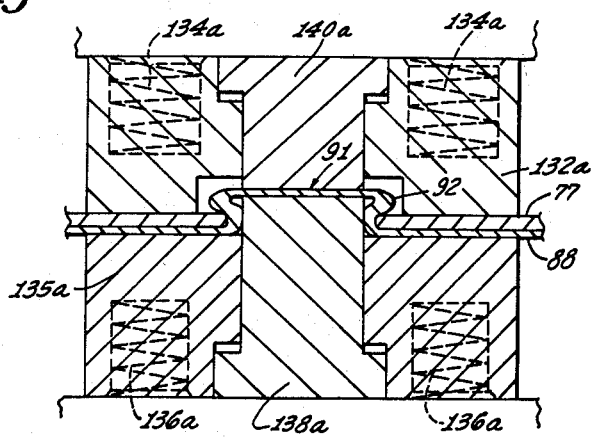
FIG. 43 is a similar view showing the staking operation completed.

In the preferred practice of the invention, however, the closing action of the dies continues with consequent impact compressive force against the transverse end wall of the rivet, the end wall of the rivet being thinned as shown in FIG. 43 by an extrusion action which causes the metal to be additionally radially displaced to complete the formation of the bead 92 by further flaring of the peripheral wall of the rivet.

My description in specific detail of the selected practice of the invention will suggest to those skilled in the art, various changes, substitutions and other departures from my disclosure within the spirit and scope of the appended claims.

I claim:

1. A method of joining a first sheet-like element to a second sheet-like element of a deformable material of substantially uniform minimum thickness for the strength required without a break in the continuity of the second element, comprising the steps of:

forming an aperture in the first element, deforming said second element to form a hollow offset member integral therewith and of a length greater than the thickness of said first element and having a transverse wall of a thickness at least equal to the thickness of said second element;

superimposing said first element on said second element with the offset member extending through said aperture;

placing a rigid support internally of said hollow offset member to engage the inner surface of said transverse wall;

and striking the outer surface of said transverse wall with an impact blow to extrude the material of said wall outwardly to decrease the thickness thereof and simultaneously form an integral, outwardly-directed circumscribing hollow bead having a wall thickness greater than the decreased wall thickness of said transverse wall clamping overlying the edge portion of said aperture to effect the jointure while maintaining said rigid support in engagement with the inner surface of said transverse wall to hold said offset member against axial collapse under said impact blow to inhibit bending moments in the walls of said offset member.

2. A method of attaching a tab to a preselected portion of a metallic wall of a container, said portion of the wall being of a substantially uniform minimum thickness for the strength required, without destroying the continuity of the wall, including the steps of:
  forming an aperture of a predetermined size and shape in said tab;
  forming a dimple in said container wall of a predetermined configuration and of an area substantially larger than said aperture;
  shrinking and reforming said dimple by forcing at least a portion of the metal of the wall thereof towards the center of the dimple to form at said preselected portion a hollow boss of a height greater than the thickness of said tab and having a transverse wall of a thickness approximating the thickness of said preselected portion of the container wall;
  superimposing the tab and said container wall with the boss extending through the aperture of the tab to dispose the inner surface of the transverse wall of said boss spaced outwardly from the exposed face of said container wall;
  placing a rigid member against the innerside of said container wall with a portion of the member substantially filling said boss to hold said boss against axial collapse and facewisely engaging the inner surface of said transverse wall to rigidly support the same; and
  subjecting the outer surface of the transverse wall of the boss to an impact force to cause the metal of said wall to be extruded radially outwardly, while said wall is held against bodily movement by said rigid member, to form a thickened peripheral mass of metal in overlying engagement with the defining edge of said aperture to interlock said tab to said container wall.

3. A method of attaching a first sheet to a second sheet of deformable material without destroying the continuity of the second sheet, including the steps of:
  forming an aperture in said first sheet;
  forming a dimple in said second sheet of a predetermined configuration and of larger area than said aperture;
  forcibly reducing said dimple into a steep-sided boss centrally of said dimple of a height greater than the thickness of the first sheet with radially inward flow of the material of the wall of the dimple to materially thicken the transverse and upstanding walls of the boss with the boss conforming to the configuration of the aperture and dimensioned to pass through the same;
  positioning the first sheet on said second sheet with the boss of the second sheet extending through the aperture of the first sheet;
  inserting a rigid member into said boss and engaging a face of said member with the inner surface of the transverse wall of said boss to support the same and hold said boss against axial collapse; and
  pressurally deforming the transverse wall of said boss while maintaining said rigid member in engagement with the inner surface of said transverse wall to extrude sufficient material of said transverse wall radially outward to form integrally with said transverse wall a peripheral section joining said transverse wall and the upstanding wall of the boss of a wall thickness greater than the remainder of said transverse wall and circumscribing the rim of the aperture and clamping the first sheet against the second sheet.

4. In a method of securing a tab to a preselected portion of a metallic wall of a container without a break in the continuity of the wall, the steps of forcibly deforming the preselected portion of said wall by pressure-engagement therewith to form a dimple of a predetermined size and configuration;
  pressure-engaging the dimple to reform the same by physically reducing the overall size thereof and forming a central portion of the dimple into a hollow boss of a height greater than the thickness of said tab and having a transverse wall substantially parallel to and spaced a predetermined distance from the container wall with a thickness approximating the thickness of said preselected portion of the container wall;
  forming an aperture in said tab of substantially the size and cross-sectional shape of said hollow boss;
  superimposing the tab and the container wall with the hollow boss extending through the aperture; and
  forcibly thinning said transverse wall between mating die surfaces of coacting die members, as one of said die members is held within said hollow boss in engagement and rigidly supporting the inner surface of the transverse wall of said hollow boss, to produce flow of the metal in said transverse wall outwardly in a direction substantially paralleling the said die surfaces sufficient to form a peripherally extending bead overlying and intimately engaging an area of the tab adjacent said aperture to anchor said tab to said container wall.

5. A method of joining a first sheet-like element to a second sheet-like element of a deformable material having a substantially uniform minimum thickness for the strength required without a break in the continuity of the second element, comprising the steps of:
  forming an aperture in said first element;
  deforming said second element to form a hollow offset member integral therewith having a transverse wall of a thickness approximating the thickness of said second element and of a height greater than the thickness of said first element;
  facewisely engaging said first element to said second element with the hollow offset member extending through said aperture of the first element;
  providing means for engaging and rigidly supporting said transverse wall to maintain the same a predetermined distance from the exposed face of said first element and for obviating axial stresses in the upstanding wall of said offset member; and
  forcibly decreasing the thickness of said transverse wall by an impact blow, while said means is held in engagement with the inner surface of said transverse wall, to displace outwardly material of the wall sufficient to form an outwardly directed hollow circumscribing bead having a wall thickness substantially greater than the decreased thickness of said transverse wall and having an overall height at least equal to said predetermined distance, and overlying and engaging the defining edge portion of the aperture of said first element to effect the jointure between the later and said second element.

6. A method of joining a first sheet-like element to a selected segment of a second sheet-like element of a deformable material and of a substantially uniform minimum thickness for the strength required at the jointure without a break in the continuity of the second element, comprising the steps of:
  forming an aperture in said first element;
  deforming said selected segment of said second element to form a dimple-like section of a predetermined configuration and of substantially larger area than said aperture;
  forcibly reducing said dimple-like section to form a hollow offset member having a transverse wall approximating the thickness of said second element and of a height greater than the thickness of said first element;
  superimposing said first element and said second element with the offset member extending through said aperture;

and forcibly decreasing the thickness of said transverse wall to displace outwardly sufficient material of the wall, while the inner surface of said transverse wall is facewisely engaged with a rigid support to maintain the same a predetermined distance from said first element, to form an outwardly directed hollow circumscribing bead having a wall thickness substantially greater than the final thickness of said transverse wall and of a height substantially equal to said predetermined distance plus the final thickness of said transverse wall, and overlying and engaging the defining edge portion of the aperture of said first element to effect the jointure between the latter and said second element.

7. A method of attaching a first member to a second member of deformable sheet material without destroying the continuity of the sheet material, including the steps of:
 forming an aperture in said first member;
 offsetting a portion of said second member to form a hollow rivet integral therewith of a height greater than the thickness of said first member with an upstanding wall and a transverse end wall having a concavo-convex contral formation and an annular planar segment circumscribing said central formation, with the hollow rivet dimensioned to extend through said aperture;
 superimposing the first member on said second member with the hollow rivet extending through said aperture of the first member to position said end wall of the rivet above the first member;
 positioning a rigid support within said hollow rivet to engage a face of said support with the inner surface of said end wall;
 with the upstanding wall of the hollow rivet free to expand radially in a region beyond the outer surface of the first member, expanding said end wall radially by flattening the end wall; and
 thereafter subjecting the end wall to a compressive force, while engaged by said rigid support, to extrude sufficient material of said wall radially outward to form a peripheral section joining said end wall and the upstanding wall of the rivet and of a wall thickness greater than the final thickness of said end wall and circumscribing the rim of said aperture to clamp the first member to said second member.

8. A method of attaching a first member to a second member of deformable sheet material without destroying the continuity of the sheet material of said second member, including the steps of:
 forming an aperture in said first member;
 offsetting a portion of the sheet material of said second member to form a hollow rivet having a peripheral wall and an end wall of a thickness approximating the thickness of said second member with the hollow rivet dimensioned to extend through said aperture;
 superimposing the first member on said second member with said hollow rivet extending through the aperture of said first member;
 inserting within said hollow rivet a support member to engage a face of the latter with the inner surface of the transverse end wall of said rivet;
 while maintaining the face of said support member engaged with the inner surface of said transverse end wall, striking the outer surface of said transverse end wall with an impact blow of a magnitude sufficient to extrude the material of said wall radially outward to form integral with said wall a hollow bead circumscribing the defining edge portion of the aperture having a wall thickness greater than the final thickness of said transverse end wall and clampingly attaching the first member to said second member; and
 selectively limiting the radial extrusion of the material or said transverse end wall by blocking preselected portions of the extruding material to thereby further thicken preselected segments of the wall of said bead.

9. A method of attaching a first member to a second member of deformable sheet material of a preselected minimum thickness for the strength required for the attachment without destroying the continuity of the sheet material, including the steps of:
 offsetting a selected portion of said sheet material of the second member to form a relatively large dimple with freedom for the sheet material to flow edgewise into the said selected portion to minimize thinning of the sheet material offset to form the dimple;
 pressurally engaging at least the peripheral portion of the dimple to cause the wall thereof to collapse with radial inward flow of the material of the wall to form centrally thereof a hollow rivet having a transverse end wall approximatting the thickness of said second member and of a height greater than the thickness of said first member;
 forming an aperture in said first member substantially the size and cross-sectional shape of said rivet;
 superimposing the first member and said second member with the hollow rivet of said second member extending through said aperture;
 positioning a rigid support member to engage a face of the latter with the inner surface of the transverse end wall of said rivet; and
 while maintaining the face of said support member engaged with the inner surface of said transverse end wall, subjecting the outer surface of said transverse end wall to an impact force of a magnitude sufficient to extrude the material of said wall radially outward as the rivet is held against axial collapse by said support member to form integral with said wall a hollow bead circumscribing the defining edge portion of the aperture having a wall thickness greater than the final thickness of said transverse end wall and clampingly attaching the first member to said second member.

10. A method of attaching a first sheet to a second sheet of deformable material without destroying the continuity of the second sheet, including the steps of:
 forming an aperture of a predetermined size and shape in said first sheet;
 forming a dimple in said second sheet of a size substantially larger than said aperture;
 placing cooperating pressure-imposing die members on opposite sides of said second sheet and pressurally reforming said dimple by flattening at least the peripheral portion of the wall thereof between said die members to induce radially inward flow of at least the material of said peripheral portion to force the central segment of the wall of the dimple into a centrally disposed cavity of one of said die members of the cross-sectional size and configuration of said aperture to form a hollow boss conforming to the cross-sectional size and configuration of the cavity of a height greater than the thickness of said first sheet and having a transverse wall of a thickness approaching the thickness of said second sheet;
 superimposing the first sheet on said second sheet with the boss of the second sheet extending through the aperture of the first sheet to dispose the inner surface of the transverse wall of said boss above the exposed face of said first sheet;
 placing a support against the outer side of said second sheet with a segment of the support facewisely engaged with the undersurface of said transverse wall to rigidly support the same above the exposed face of said first sheet and to hold said boss against axial collapse; and
 striking the upper surface of the transverse wall of the boss with an impact member to cause sufficient material of said wall to be extruded radially outwardly while said boss is held against axial collapse by said support, to form a thickened peripheral mass of material in overlying engagement with the defining edge of said aperture to clampingly attach said first sheet to said second sheet.

References Cited by the Examiner

UNITED STATES PATENTS

| | | | |
|---|---|---|---|
| 202,994 | 4/78 | Clifford | 10—27 |
| 1,715,812 | 6/29 | Bauer | 29—33 |
| 1,792,897 | 2/31 | De Lacy. | |
| 1,870,728 | 8/32 | Hothersall | 29—33 |
| 1,915,299 | 6/33 | Draper. | |
| 1,990,718 | 2/35 | Swanstrom. | |
| 2,083,589 | 6/37 | Arthur et al. | 10—27 |
| 2,453,503 | 11/48 | Emmons | 29—522 |
| 2,544,969 | 3/51 | Underwood | 113—121 |
| 2,753,624 | 7/56 | Taylor | 29—522 |
| 3,058,204 | 10/62 | Jorgensen | 113—51 X |
| 3,070,058 | 12/62 | Boyer | 113—121 |

FOREIGN PATENTS 590,720  7/47  Great Britain.

WHITMORE A. WILTZ, *Primary Examiner.*

JOHN F. CAMPBELL, *Examiner.*